Figure 2:
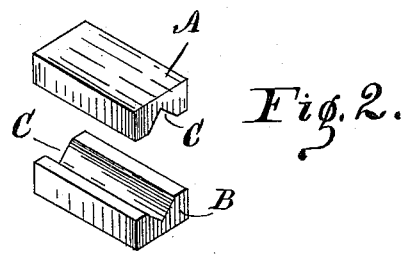

(No Model.)

M. O. REEVES.
METHOD OF MAKING WOODEN SPLIT BUSHINGS.

No. 419,558. Patented Jan. 14, 1890.

Witnesses
A. M. Hood.
V. M. Hood.

Inventor
Milton O. Reeves.
By H. P. Hood
Attorney

UNITED STATES PATENT OFFICE.

MILTON O. REEVES, OF COLUMBUS, INDIANA, ASSIGNOR TO THE REEVES PULLEY COMPANY, OF SAME PLACE.

METHOD OF MAKING WOODEN SPLIT BUSHINGS.

SPECIFICATION forming part of Letters Patent No. 419,558, dated January 14, 1890.

Application filed July 15, 1889. Serial No. 317,571. (No model.)

*To all whom it may concern:*

Be it known that I, MILTON O. REEVES, a citizen of the United States, residing at Columbus, in the county of Bartholomew and State of Indiana, have invented a new and useful Improvement in the Method of Making Wooden Split Bushings, of which the following is a specification.

My invention relates to an improved method of forming split wooden bushings for pulleys. Heretofore bushings of this kind have usually been formed by taking a solid block of wood a little longer and of larger diameter than the desired bushing and boring a central hole from end to end of the block of smaller diameter than that required in the finished bushing, then setting the block thus prepared to one side to season, then counterboring the seasoned block to the required size to fit the shaft on which the pulley is to be mounted, then shaping the outside of the bushing to fit the opening in the pulley, and, lastly, splitting the bushing longitudinally along its center. It is essential that the hole through the center of the bushing be straight and of equal diameter throughout. It has been found difficult in boring to prevent the auger from being deflected by hard spots in the wood, and the original line of boring being followed by the counterboring-tool inequalities in the bore are caused, which prevent a perfect fit of the bushing on the shaft.

The object of my improvement is to avoid the above-mentioned difficulties and to form a straight and true hole through the bushing. This result I accomplish in the following manner: I take two pieces of thoroughly-seasoned wood, each of sufficient length, width, and thickness to form one longitudinal half of the proposed bushing. I then form in one face of each of said pieces a true and straight central longitudinal groove, preferably rectangular in cross-section and adapted to closely fit the tail-spindle of a boring-lathe. This groove may be formed on an ordinary molding or grooving machine or in any well-known manner. An auger or other suitable boring-tool, of the same diameter as the shaft on which the bushing is to fit, is now secured in the running spindle of a boring-lathe, and the tail-spindle of the lathe is set so as to support and hold central the free end of the boring-tool. I then clamp the grooved pieces together upon and inclosing the tail-spindle of the boring-lathe, and then slide the pieces thus clamped together along said spindle and over the rapidly-revolving boring-tool. The tail-spindle of the lathe thus forms a guide for the bushing, and a true and perfect hole is formed therein.

The accompanying drawings illustrate the process.

Figure 1:
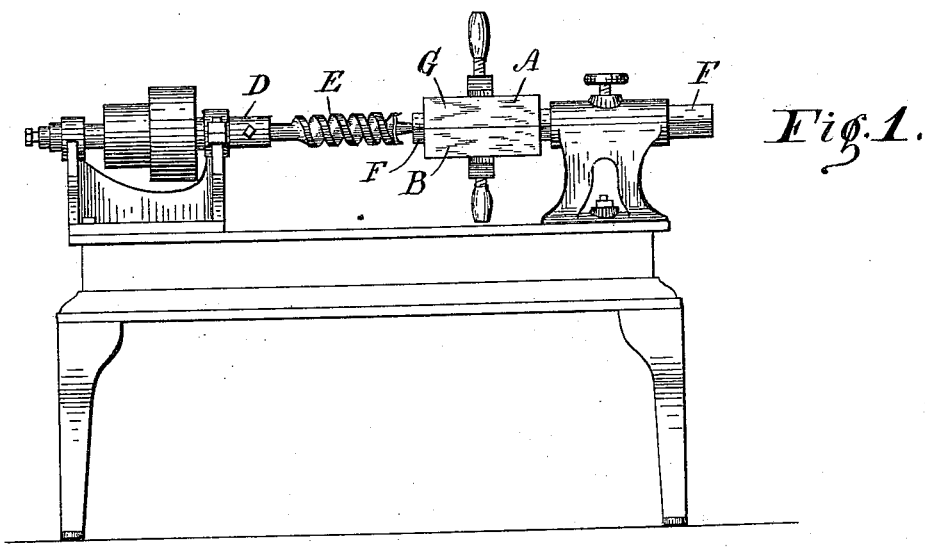

Figure 1 represents a side elevation showing the bushing in position on the boring-lathe. Fig. 2 represents the two pieces which form the bushing after grooving.

A and B are the pieces. C is the groove in each.

D is the running spindle of the boring-lathe; E, the boring-tool; F, the tail-spindle, and G the bushing.

I claim as my invention—

That method of forming split wooden bushings for pulleys which consists in taking two pieces of wood, each of sufficient length, width, and thickness to form one longitudinal half of the proposed bushing, and forming in one face of each of said pieces a central longitudinal groove adapted to closely fit the tail-spindle of a boring-lathe, then clamping the grooved faces of said pieces together upon and inclosing said spindle, and then sliding the pieces thus clamped together along said spindle and over a revolving boring-tool supported by and arranged in line with the spindle, whereby the bushing is guided by the spindle in its movement over the boring-tool, substantially as specified.

MILTON O. REEVES.

Witnesses:
CHARLES F. REMY,
MARSHALL HACKER.